H. C. HACHMUTH.
CHERRY STEMMING MACHINE.
APPLICATION FILED APR. 24, 1920.

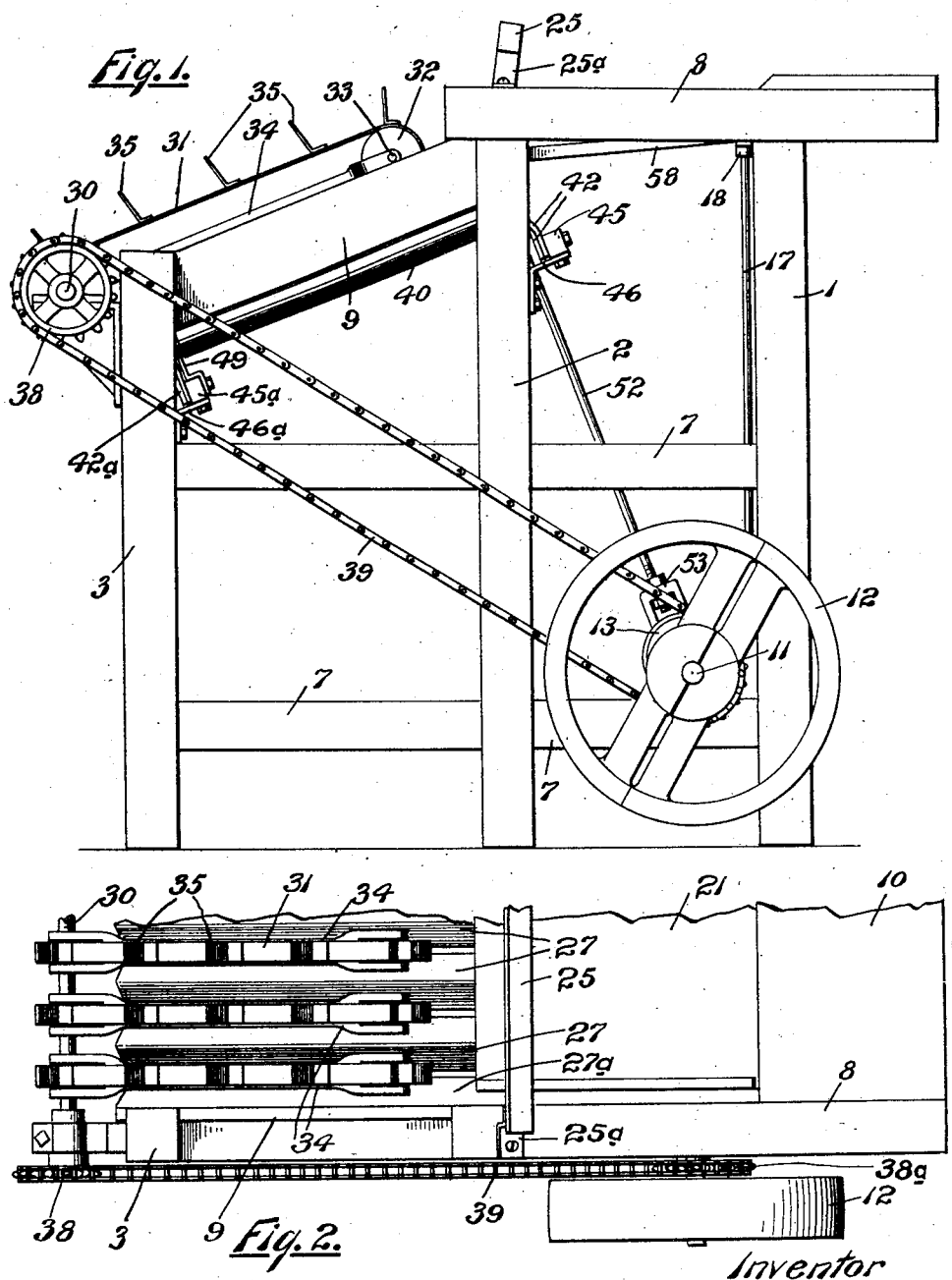

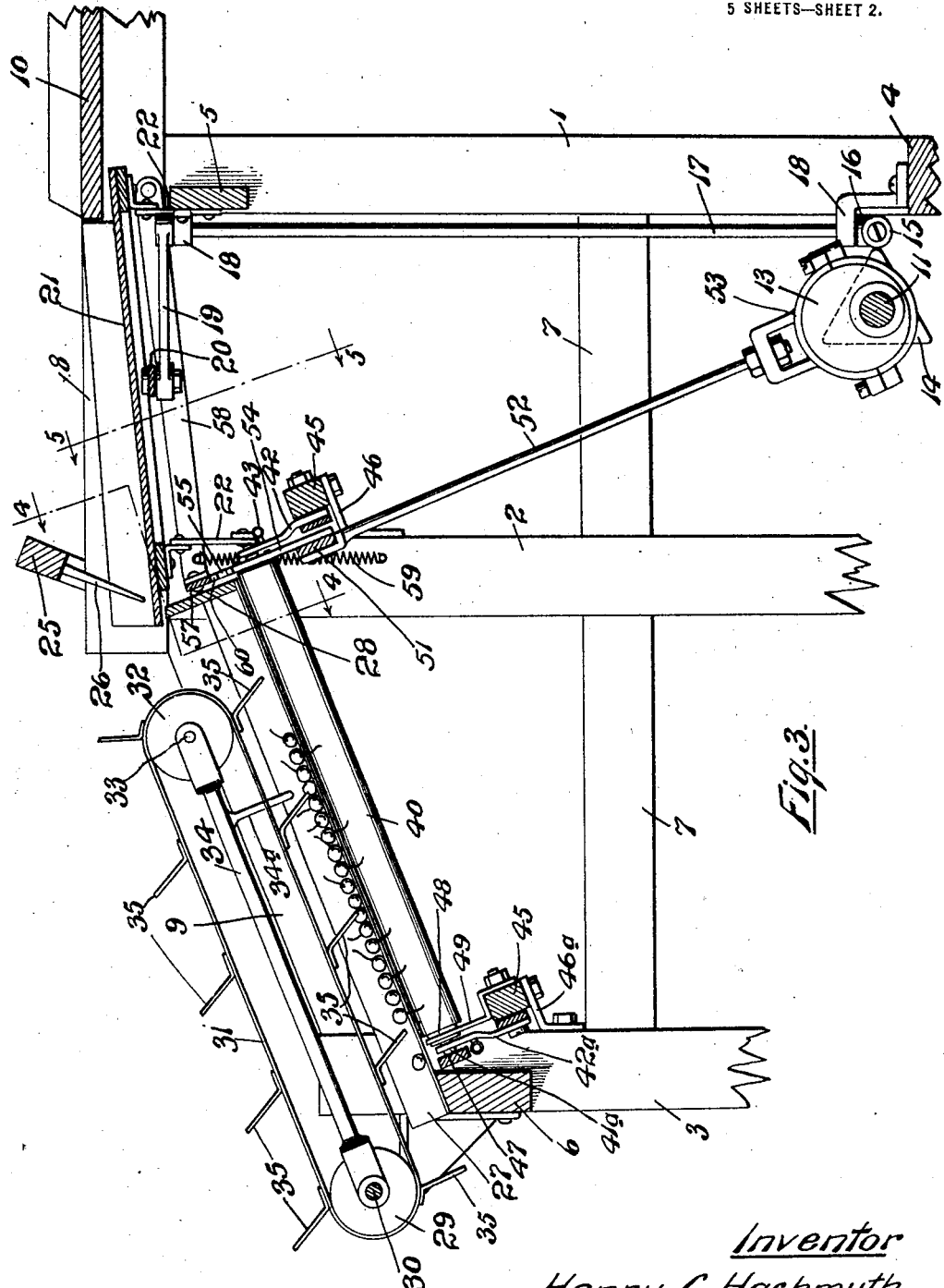

1,403,946.

Patented Jan. 17, 1922.
5 SHEETS—SHEET 3.

Inventor
Henry C. Hachmuth
By Frank E. Liverance, Jr.
Attorney

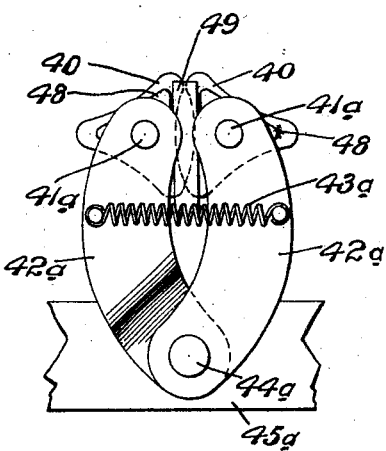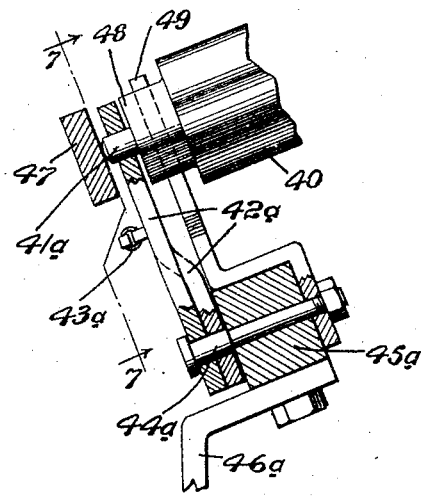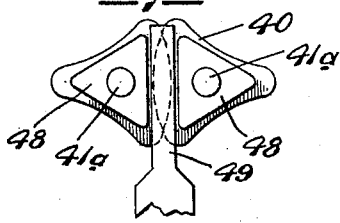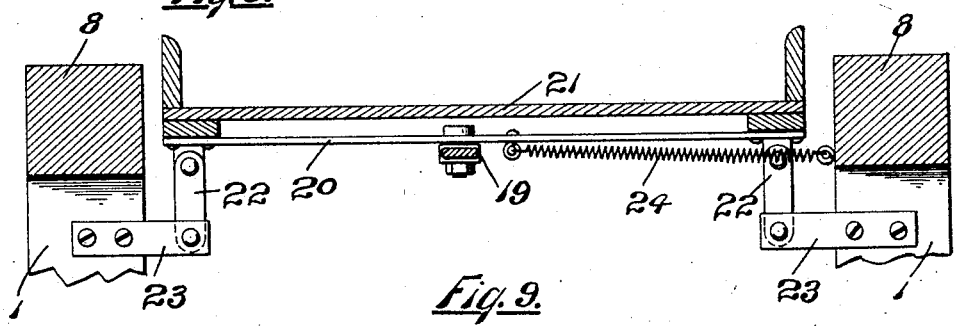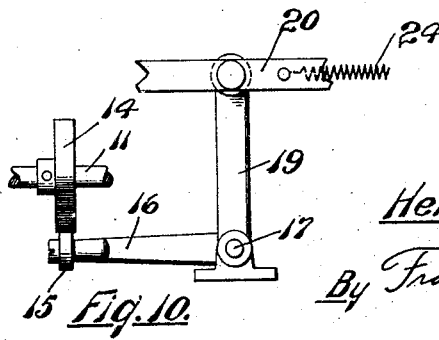

H. C. HACHMUTH.
CHERRY STEMMING MACHINE.
APPLICATION FILED APR. 24, 1920.

1,403,946.

Patented Jan. 17, 1922.
5 SHEETS—SHEET 5.

Inventor
Henry C. Hachmuth
By Frank E. Liverance, Jr.
Attorney

UNITED STATES PATENT OFFICE.

HENRY C. HACHMUTH, OF COMSTOCK PARK, MICHIGAN.

CHERRY-STEMMING MACHINE.

1,403,946.   Specification of Letters Patent.   Patented Jan. 17, 1922.

Application filed April 24, 1920. Serial No. 376,208.

*To all whom it may concern:*

Be it known that I, HENRY C. HACHMUTH, a citizen of the United States of America, residing at Comstock Park, in the county of Kent and State of Michigan, have invented certain new and useful Improvements in Cherry-Stemming Machines; and I do hereby declare the following to be a full, clear, and exact description of the invention, such as will enable others skilled in the art to which it appertains to make and use the same.

This invention relates to cherry stemming machines and is particularly concerned with a novel construction of machine in which a large quantity of cherries may be taken as they come from the pickers with stems on all or part of the cherries, and with the stems of varying lengths, or joined together in clusters, and the stems completely removed leaving only the stemmed cherries to be delivered from the machine. It is a primary object and purpose of this invention to provide a novel means and mechanism for grasping the stems relatively close to the bodies of the cherries to pull the same away from the cherries whereby the machine is capable of stemming cherries, not only when the full length of stem is present but also when but part of the stem is present as happens very often when cherries are picked by cutting the stems with shears or the like. A further object of the invention is to provide a machine of this character which is fully practical and operative and one which will not get out of order in operation. Various other objects and purposes, together with novel mechanisms for attaining the same, will appear fully and in detail as understanding of the invention is had from the following description, taken in connection with the accompanying drawings, in which, Fig. 1 is a side elevation of the machine.

Fig. 2 is a fragmentary plan view thereof.

Fig. 3 is a fragmentary enlarged vertical section taken lengthwise of the machine.

Figure 5:
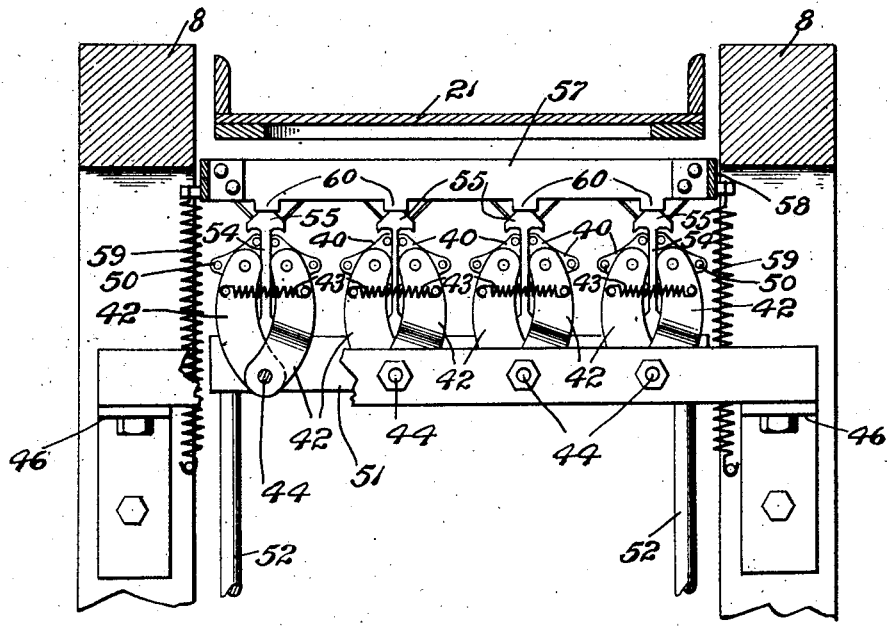

Fig. 5, similarly, is a transverse section on the plane of line 5—5, of Fig. 3.

Fig. 6 is a fragmentary enlarged section and side view illustrating the mounting of the stemming members at the lower ends thereof.

Fig. 7 is an end elevation showing the mounting of the lower ends of the stemming members, substantially on the plane of line 7—7 of Fig. 6.

Fig. 8 is an end view of a pair of the stemming members looking at the lower ends thereof, the supporting arms therefor being removed.

Fig. 9 is a transverse section through the cherry table and illustrating the means used for mounting the same for lateral vibratory movements.

Fig. 10 is a fragmentary enlarged plan view of the mechanism used for operating the cherry table.

Figure 11:
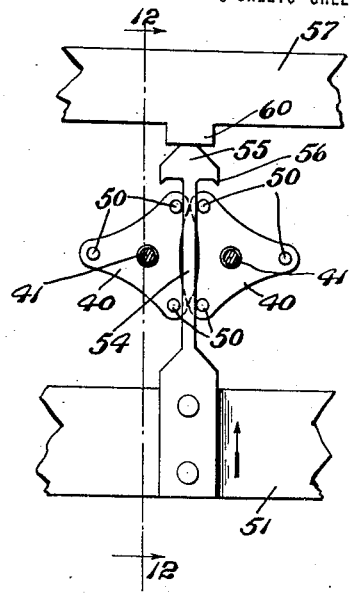

Fig. 11 is a fragmentary end elevation of a pair of stemming members looking against the upper ends thereof and showing the same in one position, together with the operating member therefor.

Figure 12:
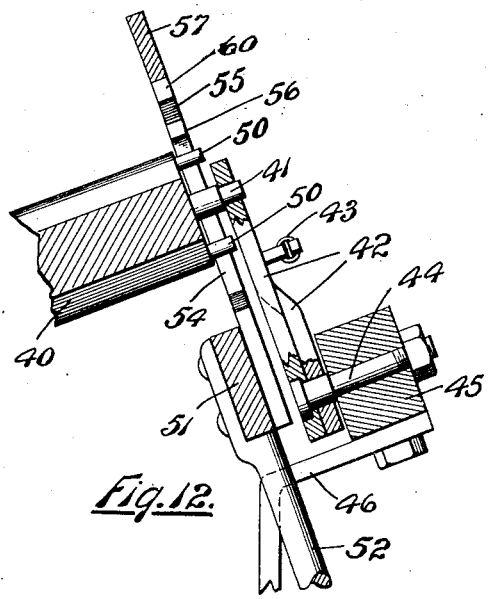

Fig. 12 is a fragmentary enlarged section substantially on the plane of line 12—12, of Fig. 11 and showing the construction and mounting of the stemming members at their upper ends.

Figure 13:
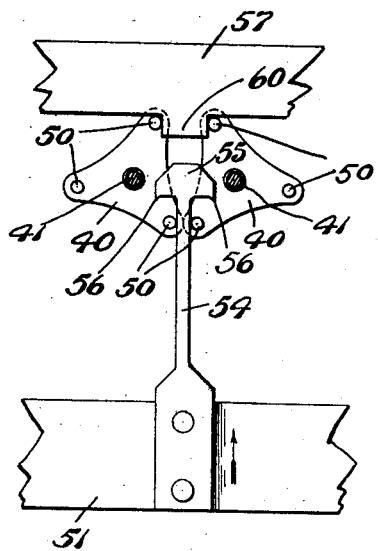
Figure 14:
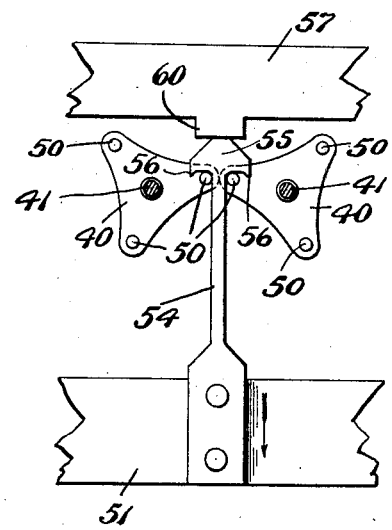

Fig. 13 is a view, similar to Fig. 11, with the parts in a different position, and Fig. 14 is another view similar to Fig. 11 and Fig. 13, with the parts in still another position.

In the different figures of the drawings, like reference characters refer to like parts, and the different sections noted are taken looking in the directions indicated by the arrows.

In the construction of the machine, a frame for carrying the mechanism is provided including a pair of spaced apart front posts 1, intermediate posts 2, and rear posts 3. The front posts 1 are connected by cross members 4 and 5 and the rear posts adjacent their upper ends by a cross beam 6. Members 7 connect posts 1, 2 and 3 at each side of the frame below their upper ends, and at each side of the frame, beams 8 connect the posts 1 and 2 at their upper ends. Narrow side pieces 9 extend between posts 2 and 3, the same inclining downwardly to the rear. A stationary table 10 is located at the upper ends and in front of the front posts 1, as shown.

A main drive shaft 11 is mounted in suitable bearings transversely of the frame at the lower front portion thereof, and is driven from any suitable source of power by belting around the drive pulley 12 on the shaft. An eccentric 13 and a triangular cam 14 are fixed on and turn with the shaft. A roller 15 mounted on the free end of an arm 16 which is connected at its other end to the lower end of a vertical rod 17 bears against the cam. Rod 17 is mounted in brackets 18 for turning movement and at its upper end has an arm 19 attached thereto, the same having attachment to a bar 20 attached to and lying transversely of and under a table 21 which is mounted on links 22, pivotally attached at their lower ends to brackets 23 secured to the posts 1 and 2, whereby the table may be moved laterally back and forth. A spring 24 under tension normally tends to move the table in one direction, and causes the roller 15 to bear against the cam 14. Rotation of the shaft 11, accordingly has the effect to continuously vibrate table 21 from side to side and distribute cherries over the same uniformly over the table and carry them to the rear, the table having a slight downward inclination to the rear as indicated in Fig. 3. A bar 25 is mounted on bracket 25ª so as to extend transversely over the table 21 at the rear thereof, from which fingers 26 project downwardly to guide the cherries and permit the passage thereof one at a time between adjacent fingers.

Back of and below the rear edge of table 21, a plurality of sheet metal members 27 of inverted V-shape are disposed in parallelism between the cross beam 6 and a cross support 28 disposed between the intermediate posts 2. These members 27 are inclined downwardly at a considerable angle to the rear and together with members 27ª, shown in Fig. 4, one at each side of the frame, make a plurality of troughs slotted at the bottom, the stems of cherries being adapted to extend through the slots, while the cherries ride down the troughs.

Figure 4:
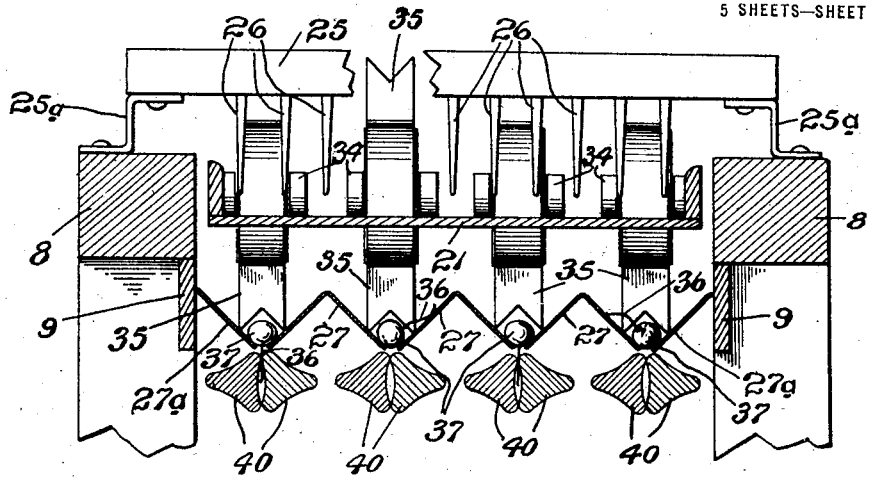
Fig. 4 is a transverse section taken substantially on the planes of the broken line 4—4 of Fig. 3.

At the lower ends of the troughs and above the same, rollers 29, one for each trough, are fixed on a shaft 30. An endless belt 31 passes around each roller 29 and also around a second roller 32, mounted on a short shaft 33 carried between the forks of the forked end of a supporting bar 34 mounted at its lower end on shaft 30 and supported adjacent its upper end by an integral post 34ª which is attached to an adjacent member 27. There is one of these belts and carrying units therefore for each trough, and the lower run of each belt passes from front to rear over its associated trough. A plurality of wings or vanes 35 are attached to each belt, moving therewith and passing at their free ends lengthwise of and within the troughs. Each wing is notched at its free end, as best shown in Fig. 4 so as to practically pass over the cherries but engage with any stems of the cherries and turn the same so as to enter the slots in the troughs. The stems of the cherries are indicated at 36 and the cherries at 37. In the operation of the machine, the shaft 30 is driven from the drive shaft 11, a sprocket wheel 38 on shaft 30 and similar wheel 38ª on drive shaft 11 having an endless sprocket chain 39 passing around the same as shown.

Below the paralleling each of the cherry receiving troughs, a pair of stemming members 40 are rotatably mounted, the same being substantially triangular in shape and positioned directly below the slot in each trough. Pintles 41 and 41ª project from the upper and lower ends of the members 40 and are rotatably mounted in curved arms 42 and 42ª, respectively, the arms at the upper and lower ends of each pair of stemming members being normally drawn together at their upper ends by springs 43 and 43ª and overlapping at their lower ends and pivotally mounted on pintles 44 and 44ª carried by cross bars 45 and 45ª which are supported by brackets 46 and 46ª attached to the frame of the machine. It is evident that the members of each pair of stemming members may be moved apart but that normally under the influence of springs 43 and 43ª they are held in close contact. The ends of the lower pintless 41ª have thrust bearing against a cross bar 47. Each member 40 at its lower end is formed with a short reduced triangular portion 48 and a bar 49 attached to the supporting bar 45ª lies between said portions of each pair of stemming members, serving a function which will later be described.

From each of the apexes of the triangle at the upper end of each stemming member 40, a pin 50 projects. A transverse bar 51 is mounted at the upper ends of and extends between two rods 52 which are connected to eccentric housings 53 at their lower ends, the same being located around the eccentrics 13, whereby with each rotation of shaft 11, the rods 52 are reciprocated and bar 51 raised and lowered. From the bar 51 a plurality of operating members 54 extend upwardly, one for each pair of stemming members, each operating member passing between adjacent pins 50 on the upper ends of the stemming members of each pair. Each operating member terminates in a head 55 having inclined sides and formed with hooked portions 56 at its lower outer corners as shown. A bar 57 lies directly over all of the heads 55 and is carried by and between two arms 58, pivotally mounted at their front ends on the frame of the machine. Springs 59 tend to draw the bar 57 downwardly so as to bring the projections 60 on the bar against the heads, one of said projections being formed on bar 57 for each operating member directly over the head thereof.

In the operation of the stemming portion of the machine, supposing the parts to occupy the position shown in Fig. 13, the bar 51 with attached operating members 54 is moving in an upward direction, while the upper adjacent edges or corners of stemming members 40 are held apart by the engagement of the pins 50 at such corners against the sides of the adjacent projection 60. With the continuation of the upward movement, the heads 55 strike projections 60, elevating bar 57 and after the heads have passed upward between the upper pins 50, the upper corners of the pair of stemming members come together, as shown in Fig. 11, grasping the stems of any cherries which may have passed downwardly through the slots in the trough and between members 40 while in the position shown in Fig. 13. On the downward movement of the bar 51 and the operating members attached thereto, the under hooked sides of the head engage with the pins 50 at the upper corners of the stemming members and cause said members to turn as shown in Fig. 14, the stems which have been grasped being pulled from the cherries. Springs 43 yield during this movement and allow spreading of the arms 42 and 42ª, while the bar 57 follows the heads 55 in their downward movements. The completion of the downward movement of bar 51 brings another pair of pins 50 against the sides of the adjacent projection 60 with the stemming members in position for the entrance of stems between them. As soon as a projection 60 is elevated out of engagement with pins 50, the stems are grasped, through the action of the springs 43 and 43ª and the bearing of the triangular portions 48 against the sides of bars 49, a turning movement being made as is obvious. Bars 49 and portions 48 also serve to insure even turning of the stemming members. The operation is the same with respect to each pair of stemming members and each pair is operated simultaneously with the remaining pairs of stemming members.

With a machine constructed as described, it is not particularly important whether or not the stems are full length as the stems in any case are grasped very close to the cherries before pulling therefrom. The machine is capable of taking care of a large quantity of cherries, delivering the same with stems removed at the rear lower ends of the troughs, down which the stemmed cherries will move by gravity, assisted by the action of the wings 35 as the same traverse the lengths of the troughs. The construction is durable and efficient and capable of effectively stemming cherries irrespective of how the stems are, either short or long, or joined in clusters.

Various changes in constructive detail may be resorted to without changing the invention which is defined in the appended claims, and I consider myself entitled to all forms of construction which come within the scope of the claims.

I claim:

1. In a cherry stemming machine, pairs of stemming members, means normally holding the members apart to permit the entrance of stems between them, means tending to draw the members together to grasp the stems on release of said holding apart means, and means for releasing the stemming members to grasp the stems and for operating the same to pull the stems from cherries, substantially as described.

2. In a cherry stemming machine, stemming members, means holding the same separate to permit the entrance of stems between them, spring means normally tending to close the members on the stems, means for rendering the separating means ineffective and means for periodically operating the stemming members to pull the stems from cherries, substantially as described.

3. In a cherry stemming machine, pairs of rotatably mounted stemming members, means for periodically rotating the same, means for separating the members of each pair between rotations to permit the entrance of stems between them, and means for bringing the members of each pair against each other prior to rotative movement thereof, substantially as described.

4. In a cherry stemming machine, a pair of rotatably mounted stemming members, means for periodically rotating the same, and means for separating the members to permit the entrance of stems between them during the time that the said members are not rotated, substantially as described.

5. In a cherry stemming machine, a pair of rotatably mounted stemming members located in parallelism, pivotally mounted arms carrying said members, spring means tending to draw the members toward each other, a trough having a slotted lower portion located directly over and parallel to the stemming members, means for periodically rotating the stemming members, and means for holding the stemming members separate between times of rotation thereof, substantially as and for the purposes described.

6. In a cherry stemming machine, a support, a trough having a slotted lower portion extending the length of the trough, means for carrying cherries into the trough, a pair of stemming members located beneath and parallel with the trough, means normally holding the stemming members in contact with each other, means for periodically turning the stemming members, means for holding the members apart between times of turning, and means for normally causing stems on cherries carried into the trough to be positioned through the slot in the trough and between the stemming members for action when the said members are turned to thereby pull the stems from the cherries, substantially as described.

7. In a cherry stemming machine, a downwardly inclined trough having a slotted bottom through which stems of cherries in the trough may extend, and means below the trough for periodically grasping the projecting stems and pulling them from the cherries, substantially as described.

8. In a cherry stemming machine, a pair of triangular shaped rollers mounted in parallelism, means for yieldingly holding the rollers against each other, means for engaging with the rollers to hold the same separated at their upper edges, and means for moving said separating means away from the rollers to permit the same to come together and thereafter turn the rollers a partial revolution about the longitudinal axes thereof, substantially as described.

9. In a cherry stemming machine, a downwardly inclined trough slotted lengthwise thereof at the bottom, means for delivering cherries thereto at the upper end of the trough, a pair of stemming members mounted below and parallel to the trough, and means for alternately opening and closing said stemming members for the reception and gripping of stems of cherries extending through the slot in the trough, and means for operating the stemming members after gripping the stems to pull the stems from the cherries.

10. In a cherry stemming machine, a support, two pairs of spaced apart arms pivotally mounted at their lower ends on the support, a triangular shaped member carried rotatably between the like arms of each pair, there being two of said members located in parallel relation to each other, spring means normally tending to draw the members into contact engagement with each other, pins projecting from one end of each of said members, means mounted above the pins and adapted to engage between the same for holding the members separated, and means mounted below the members and operable in an upward and then a downward direction for elevating said separating means to permit the members to come together, and then engage with the said pins and turn the members, substantially as described.

11. In a cherry stemming machine, a support, two spaced apart pairs of arms pivotally mounted on the support, two stemming members mounted in parallel relation and carried by and between the upper ends of said arms, springs connecting the arms of each pair and tending to draw the stemming members into contact engagement with each other, a trough slotted lengthwise in its lower portion mounted directly above the stemming members and parallel therewith, means for holding the stemming members apart against the force of the springs, means for releasing said holding means to free the stemming members, and means for turning the stemming members a partial revolution after said release of the holding means, substantially as described.

12. In a cherry stemming machine, a pair of elongated stemming members mounted in parallel relation to each other, spring means tending to hold the members against each other, means adapted to hold the members separated against the force of the spring means, a longitudinally slotted trough located above and parallel to the stemming members, and means for operating said separating means to render it ineffective, then turn the stemming members a partial revolution and simultaneously permitting the separating means to return to normal operative position to hold the stemming members separated after completion of said partial revolution, substantially as described.

13. In a cherry stemming machine, a pair of elongated stemming members mounted in parallel relation to each other, spring means tending to hold the members against each other, a bar having a projection extending downwardly therefrom movably mounted above and at one end of the stemming members, a plurality of pins projecting from said end of each of the members, between two of which, one on each member, the projection is adapted to pass and hold the members separated, a second bar mounted below the same ends of the members, means for raising and lowering said second bar, an operating bar attached to and extending upwardly from the second bar between the pins on the stemming members, said operating bar having a head at its upper end for engaging against the projection on the first bar on its upward movement to thereby elevate the same to inoperative position, and for engaging with the pins on the stemming members on its downward movement to turn said members a partial revolution, the first bar dropping by gravity to bring its projection into position to be engaged by other pins on the stemming rollers, substantially as described.

In testimony whereof I affix my signature.

HENRY C. HACHMUTH.